(12) United States Patent
Ying

(10) Patent No.: US 12,246,584 B1
(45) Date of Patent: Mar. 11, 2025

(54) ROLLER SHUTTER TAIL COVER AND ROLLER SHUTTER COVER

(71) Applicant: Xiaoqian Ying, Zhejiang (CN)

(72) Inventor: Xiaoqian Ying, Zhejiang (CN)

( * ) Notice: Subject to any disclaimer, the term of this patent is extended or adjusted under 35 U.S.C. 154(b) by 0 days.

(21) Appl. No.: 18/885,675

(22) Filed: Sep. 15, 2024

(30) Foreign Application Priority Data

Aug. 22, 2024 (CN) .......................... 202422047399.0

(51) Int. Cl.
| | | |
|---|---|---|
| *B60J 7/08* | (2006.01) | |
| *B60J 7/04* | (2006.01) | |
| *B60J 7/057* | (2006.01) | |
| *B60J 7/19* | (2006.01) | |
| *B60Q 1/44* | (2006.01) | |
| *B60R 5/04* | (2006.01) | |
| *B60R 16/033* | (2006.01) | |
| *E05F 15/662* | (2015.01) | |

(52) U.S. Cl.
CPC ............ *B60J 7/041* (2013.01); *B60J 7/0573* (2013.01); *B60J 7/085* (2013.01); *B60J 7/198* (2013.01); *B60Q 1/44* (2013.01); *B60R 5/047* (2013.01); *B60R 16/033* (2013.01); *E05F 15/662* (2015.01); *E05Y 2201/684* (2013.01); *E05Y 2900/53* (2013.01)

(58) Field of Classification Search
None
See application file for complete search history.

(56) References Cited

U.S. PATENT DOCUMENTS

| | | | | |
|---|---|---|---|---|
| 4,795,206 A | * | 1/1989 | Adams | ........................ B60J 5/14 296/100.09 |
| 6,349,986 B1 | * | 2/2002 | Seel | ........................ B60R 21/06 160/310 |
| 6,491,332 B2 | * | 12/2002 | De Ceuster | ............. B60R 5/047 296/37.16 |

FOREIGN PATENT DOCUMENTS

KR 950005123 * 6/1995

* cited by examiner

*Primary Examiner* — Joseph D. Pape
(74) *Attorney, Agent, or Firm* — Nitin Kaushik

(57) ABSTRACT

Provided in the present disclosure are a roller shutter tail cover and a roller shutter cover with the same. The roller shutter tail cover includes a cover body, a limit switch, and a limit device, where the limit switch is disposed on the cover body, and the limit device is connected to the limit switch. During motion of the roller shutter tail cover, when the limit switch is touched, the limit switch starts the limit device, and the limit device works to limit the motion of the roller shutter tail cover. During motion of the roller shutter tail cover, if the roller shutter tail cover touches other objects, the limit switch starts the limit device, and the limit device limits the motion of the roller shutter tail cover, thereby preventing the roller shutter tail cover from pinching other objects and lowering the safety risk.

20 Claims, 4 Drawing Sheets

ROLLER SHUTTER TAIL COVER AND ROLLER SHUTTER COVER

FIELD OF TECHNOLOGY

The present disclosure relates to the technical field of roller shutter covers, specifically to a roller shutter tail cover and a roller shutter cover.

BACKGROUND

The pickup truck is a light truck with an open-top truck bed. In order to improve sealing and convenience, some pickup trucks will be mounted with retractable roller shutter covers on top of truck beds. The roller shutter cover can slide on slide rails to be opened or closed.

However, during motion of the roller shutter of the existing roller shutter cover, if a hand or an object accidentally enters the truck bed, personal injury or damage to the object is easily caused, and there is a potential safety hazard.

SUMMARY

In view of this, it is necessary to provide a roller shutter tail cover and a roller shutter cover, to solve at least one of the above problems.

In a first aspect, the present disclosure provides a roller shutter tail cover, applied to a roller shutter cover of a truck bed, and including:
  a cover body;
  a limit switch disposed on the cover body; and
  a limit device connected to the limit switch,
  where during motion of the roller shutter tail cover, when the limit switch is touched, the limit switch starts the limit device, and the limit device works to limit the motion of the roller shutter tail cover.

Further, the cover body includes an upper cover and a lower cover sequentially arranged in a height direction, where the upper cover is movably connected to the lower cover and is slidable relative to the lower cover, the upper cover has a front end part protruding from an outer surface of the lower cover, and the limit switch is disposed on the lower cover and located inside the cover body; and
  during motion of the roller shutter tail cover, the front end part can be touched to slide the upper cover relative to the lower cover, such that the upper cover abuts against the limit switch.

Further, the roller shutter tail cover further includes a side bracket sleeved at one end of the lower cover in a length direction, where a sliding groove is formed on one side of the side bracket close to the upper cover; and
  one end of the roller shutter tail cover in a length direction is inserted into the sliding groove, such that the upper cover is slidable relative to the lower cover.

Further, there are two side brackets located at two opposite ends of the lower cover in the length direction respectively, and two opposite ends of the upper cover in a length direction are inserted into corresponding sliding grooves respectively.

Further, the upper cover is provided with an L-shaped plate protruding from a lower surface thereof, the lower cover is provided with an abutting portion protruding from an upper surface thereof, the abutting portion is formed with a cavity of which an opening faces the L-shaped plate, and the limit switch is located on a sidewall of the cavity; and under an external force, a front end of the L-shaped plate can enter the cavity through the opening of the cavity and abuts against the limit switch.

Further, there are two limit switches located at the two opposite ends of the lower cover in the length direction respectively.

Further, the upper cover is provided with a bump extending along a horizontal direction, a limit cavity is formed on one side of the lower cover close to the bump, at least part of the bump is embedded into the limit cavity, and an upper surface of the bump abuts against a top wall of the limit cavity to limit motion of the upper cover in a height direction.

Further, the upper surface of the bump is provided with an arc-shaped portion abutting against the top wall of the limit cavity.

Further, the limit switch is a micro point touch switch with a micro point touch panel.

Further, the limit device is a lock body disposed in the cover body and having a deadbolt movably passing through the cover body, and the deadbolt can extend out of the cover body to limit motion of the cover body.

Further, the lock body is provided with two deadbolts disposed at two opposite ends of the cover body in a length direction and capable of simultaneously extending out of the cover body to limit motion of the cover body.

Further, the roller shutter tail cover further includes an elastic damper for reducing impact.

Further, there are two elastic dampers located at two opposite ends of the cover body in a length direction respectively.

Further, the roller shutter tail cover further includes a light strip disposed on the cover body.

Further, the light strip includes a brake light disposed on an outer surface of the cover body and configured to be capable of being turned on or off based on a motion state of the vehicle.

Further, the light strip includes a lighting strip located on an outer surface of the cover body.

Further, the roller shutter tail cover further includes a circuit board for controlling turn-on and turn-off of the light strip.

Further, the roller shutter tail cover further includes a power supply for supplying power to the light strip, and/or a power interface for an external power supply.

In a second aspect, the present disclosure provides a roller shutter cover, including:
  a roller shutter including a plurality of sequentially connected shutter slats and the roller shutter tail cover according to claim 1; and
  a slide rail, where the roller shutter is connected to the slide rail and is movable on the slide rail, and the limit device can limit motion of the roller shutter tail cover on the slide rail.

Further, a light strip is disposed on the slide rail; and/or the roller shutter cover further includes a driving motor for driving the roller shutter, where the limit device is a motor controller capable of controlling operation of the driving motor, and the limit switch is connected to the motor controller by means of wired or wireless signal connection.

It can be seen from the above technical solution that the embodiment of the present disclosure has at least the following advantages and positive effects:

According to the roller shutter tail cover and the roller shutter cover with the same above, due to the arrangement of the limit switch and the limit device, during motion of the roller shutter tail cover, if the roller shutter tail cover touches a human body or other objects to turn on the limit switch, the limit switch starts the limit device, and the limit device limits the motion of the roller shutter tail cover, thereby preventing the roller shutter tail cover from pinching a hand or other objects, and lowering the safety risk.

BRIEF DESCRIPTION OF THE DRAWINGS

In order to more clearly illustrate the technical solutions in the embodiments of the present disclosure or in the prior art, the accompanying drawings that need to be used in the description of the embodiments or the prior art will be briefly introduced below. Apparently, the accompanying drawings in the description below merely illustrate some embodiments of the present disclosure. Those of ordinary skill in the art may also derive other accompanying drawings from these accompanying drawings without creative efforts. In the drawings.

DESCRIPTION OF REFERENCE SIGNS 10. roller shutter cover;
100. roller shutter; 110. roller shutter tail cover; 111. cover body; 112. limit switch; 1121. micro point touch panel; 113. limit device; 1131. lock body; 1132. deadbolt; 114. upper cover; 1141. front end part; 1142. L-shaped plate; 1143. bump; 1144. arc-shaped portion; 115. lower cover; 1151. abutting portion; 1152. cavity; 1153. limit cavity; 116. side bracket; 1161. sliding groove; 117. light strip; 1171. brake light; 1172. lighting strip; 118. elastic damper; 120. shutter slat;
200. slide rail; and
300. driving motor.

DESCRIPTION OF THE EMBODIMENTS

Typical embodiments that embody the features and advantages of the present disclosure will be described in detail in the following description. It should be understood that the present disclosure can have various changes in different embodiments without departing from the scope of the present disclosure, and the description and drawings therein are essentially for illustrative purposes and not intended to limit the present disclosure.

In addition, the terms "first" and "second" are only for descriptive purposes, and cannot be construed as indicating or implying relative importance or implying the number of technical features indicated. Thus, the features defined with "first" and "second" may explicitly or implicitly include one or more of the features. In the description of the present disclosure, "a plurality of" means two or more, unless otherwise expressly and specifically defined. In addition, "/" means "or", for example, A/B may represent A or B; and "and/or" herein is merely an association relationship describing associated objects, indicating that three kinds of relationships may exist, for example, A and/or B may indicate three cases in which A exists alone, both A and B exist, and B exists alone.

The terms "dispose", "connected", and "connect" should be understood in a broad sense, unless otherwise expressly specified and limited. For example, it may be a fixed connection, a detachable connection, or an integrated connection; it may be a mechanical connection or an electrical connection; and it may be being directly connected, being indirectly connected via an intermediate medium, or a communication between interiors of two elements.

In the existing roller shutter cover, during motion of shutter slats of a roller shutter, if a hand or an object accidentally enters a truck bed, personal injury or damage to the object is easily caused, and there is a potential safety hazard.

In order to solve at least one of the above technical problems, the present disclosure proposes a roller shutter tail cover 110 and a roller shutter cover 10 with the roller shutter tail cover 110.

Figure 1:
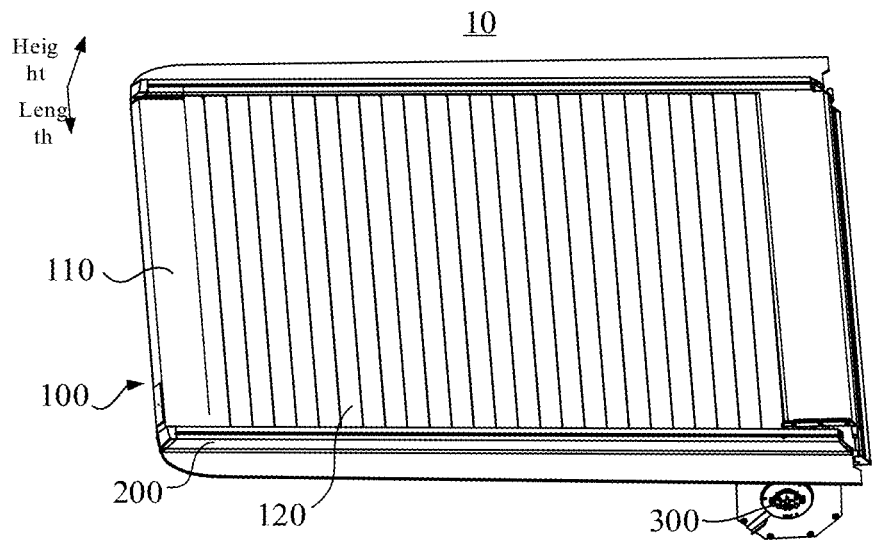
FIG. 1 is a schematic structural diagram of a roller shutter cover in an opened state in an embodiment of the present disclosure.
Figure 2:
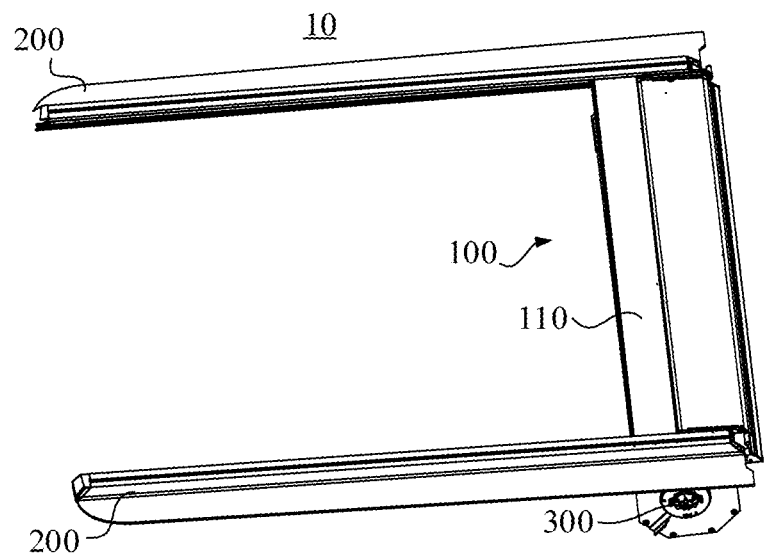
FIG. 2 is a schematic structural diagram of the roller shutter cover in a storage state that is shown in FIG. 1.
Figure 3:
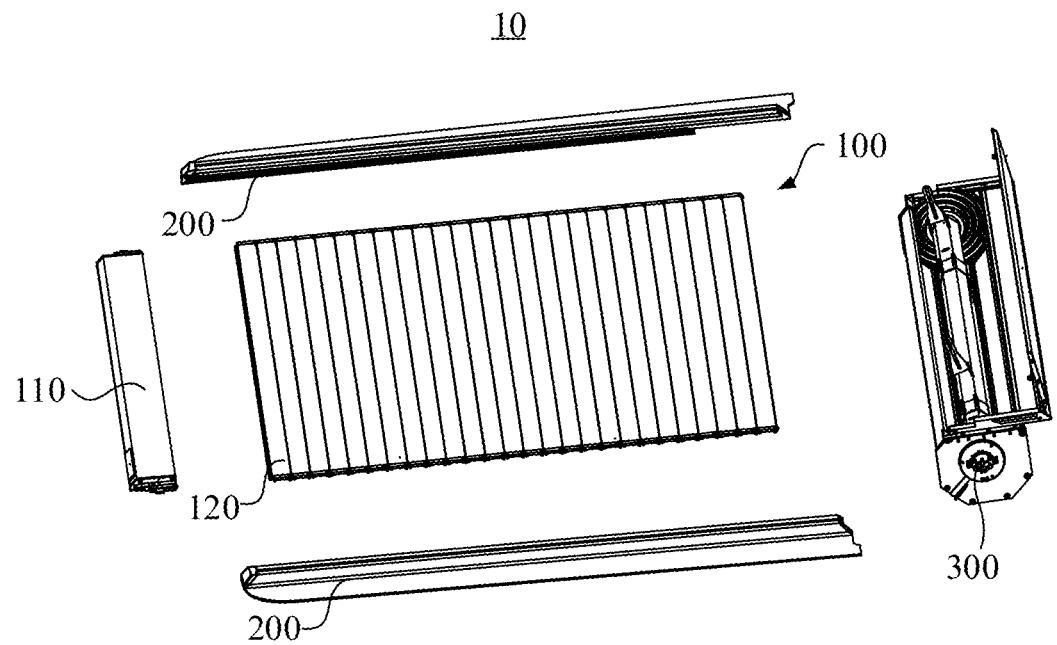
FIG. 3 is an exploded structural view of the roller shutter cover shown in FIG. 1.

Referring to FIG. 1, FIG. 2, and FIG. 3, the roller shutter cover 10 is configured to cover the truck bed of a pickup truck, and the roller shutter 100 has an opened state shown in FIG. 1 and a storage state shown in FIG. 2. When the roller shutter 100 is in the opened state, the roller shutter cover 10 can protect goods in the truck bed from wind and rain. When the roller shutter 100 is in the storage state, a user can carry the goods in the truck bed. It can be understood that the roller shutter 100 can be configured to cover the truck bed of the pickup truck, and the roller shutter 100 can also be configured to cover carrier vehicles such as cars and heavy-duty trucks.

The roller shutter cover 10 includes a roller shutter 100 and a slide rail 200, where the roller shutter 100 includes a roller shutter tail cover 110 and a plurality of sequentially connected shutter slats 120, and the roller shutter 100 is connected to the slide rail 200 and is movable on the slide rail 200, such that the roller shutter 100 switches between an opened state and a storage state.

Figure 4:
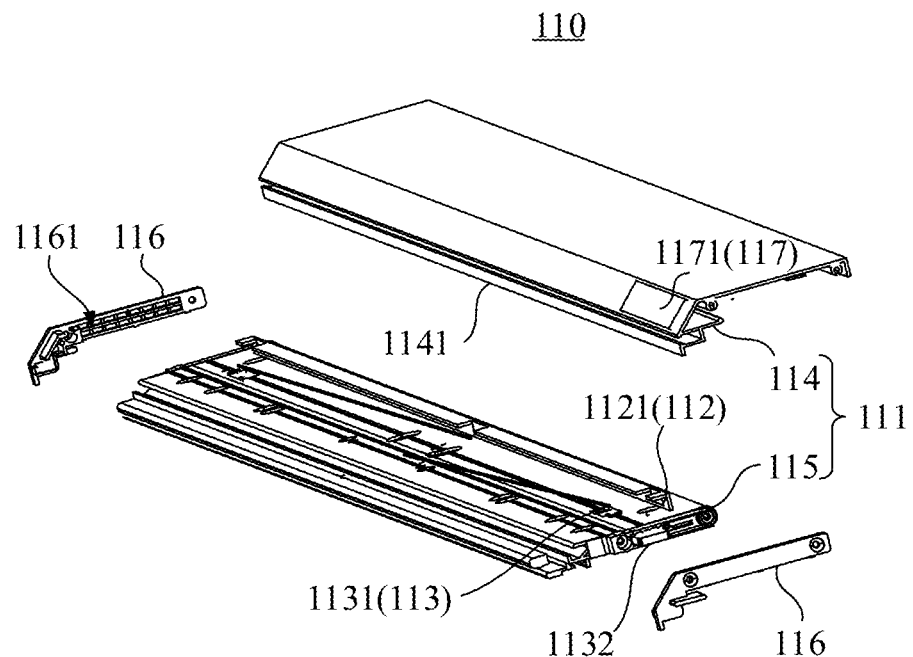
FIG. 4 is an exploded structural view of a roller shutter tail cover shown in FIG. 3.

Specifically, referring to FIG. 4, the roller shutter tail cover 110 includes a cover body 111, a limit switch 112, and a limit device 113, where the limit switch 112 is disposed on the cover body 111, and the limit device 113 is connected to the limit switch 112. During motion of the roller shutter tail cover 110, when the limit switch 112 is touched, the limit switch 112 starts the limit device 113, and the limit device 113 works to limit the motion of the roller shutter tail cover 110. It can be understood that the way for the limit switch 112 to start the limit device 113 may be a mechanical connection or an electrical signal connection. The electrical signal connection may be a wired or wireless signal connection. The wireless signal connection may be a Bluetooth connection, a WIFI connection, etc.

In the present disclosure, due to the arrangement of the limit switch 112 and the limit device 113, during motion of the roller shutter tail cover 110, if the roller shutter tail cover 110 touches a human body or other objects to turn on the limit switch 112, the limit switch 112 starts the limit device 113, and the limit device 113 limits the motion of the roller shutter tail cover 110, thereby preventing the roller shutter tail cover 110 from pinching a hand or other objects, and lowering the safety risk.

Figure 5:
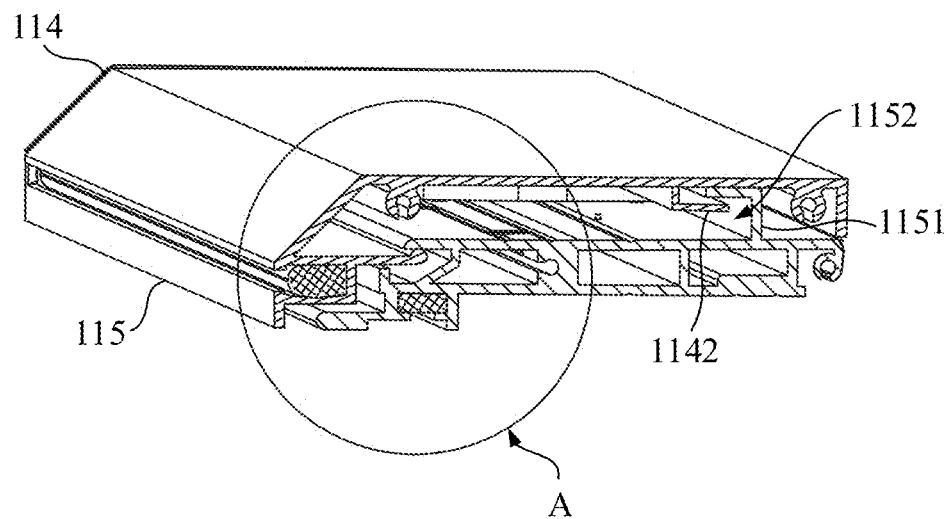
FIG. 5 is a sectional view of a roller shutter tail cover shown in FIG. 3.

Referring to FIG. 4 and FIG. 5 in combination, in this embodiment, the cover body 111 includes an upper cover 114 and a lower cover 115 sequentially arranged in a height direction, where the upper cover 114 is movably connected to the lower cover 115, the upper cover 114 is slidable relative to the lower cover 115, the upper cover 114 has a front end part 1141 protruding from an outer surface of the lower cover 115, and the limit switch is disposed on the lower cover 115. During motion of the roller shutter tail cover 110, the front end part 1141 can be touched to slide the upper cover 114 relative to the lower cover 115, such that the upper cover 114 abuts against the limit switch 112.

It is to be noted that the "length direction" and the "height direction" appearing throughout the present disclosure are as shown in FIG. 1, the "length direction" refers to a direction perpendicular to a moving direction of the roller shutter 100, the "height direction" refers to a vertical upward direction, and the "length direction" and the "height direction" have nothing to do with specific numerical values.

It is to be noted that in some possible embodiments, the limit switch 112 is disposed on an outer surface of the front end part 1141 or an infrared recognition device is disposed to recognize the limit switch 112 and the human body or the object. However, these embodiments all have the problem of easily triggering the limit device 113 by mistake. For example, tree leaves, paper scraps, or the like fall onto the infrared recognition device to trigger the limit device 113, or small broken stones, raindrops, or the like hit the limit switch 112 on the outer surface to accidentally trigger the limit device 113. In addition, the limit switch 112 disposed on the outer surface is easily damaged due to wind, rain, collision, and the like.

In the present disclosure, the limit switch 112 is disposed inside the cover body 111, thereby lowering the risk of damage caused by exposure to the outside, and avoiding the risk of accidental triggering by direct contact with tree leaves, paper scraps, or the like. In addition, the upper cover 114 needs to slide a certain distance relative to the lower cover 115 to touch the limit switch 112, and there is frictional resistance between the upper cover 114 and the lower cover 115, such that an external force on the upper cover 114 is greater than a preset threshold (the preset threshold depends on sliding resistance between the upper cover 114 and the lower cover 115). Accordingly, when light objects such as tree leaves and broken stones touch the upper cover 114, the limit switch 112 will not be triggered, thereby further lowering the risk of accidentally triggering the limit device 113.

Specifically, FIG. 4 shows that the roller shutter tail cover 110 further includes a side bracket 116, where the side bracket 116 is sleeved at one end of the lower cover 115 in a length direction, a sliding groove 1161 is formed on one side of the side bracket 116 close to the upper cover 114, and one end of the roller shutter tail cover 110 in a length direction is inserted into the sliding groove 1161, such that the upper cover 114 is slidable relative to the lower cover 115, and the upper cover 114 will not separate from the lower cover 115.

Further, there are two side brackets 116, where the two side brackets 116 are located at two opposite ends of the lower cover 115 in the length direction respectively, and two opposite ends of the upper cover 114 in a length direction are inserted into corresponding sliding grooves 1161 respectively. In this way, forces and motions at two ends of the roller shutter tail cover 110 in the length direction can be basically consistent, making it smoother and more stable for motion of the roller shutter tail cover 110. It can be understood that the manufacturer can adjust the number of side brackets 116 as needed, which is not limited in the present disclosure.

Specifically, reference is made to FIG. 4 and FIG. 5 in combination, in which FIG. 5 shows that the upper cover 114 is provided with an L-shaped plate 1142 protruding from a lower surface thereof, the lower cover 115 is provided with an abutting portion 1151 protruding from an upper surface thereof, the abutting portion 1151 is formed with a cavity 1152, an opening of the cavity 1152 faces the L-shaped plate 1142, and the limit switch 112 is located on a sidewall of the cavity 1152. Under the external force, a front end of the L-shaped plate 1142 can enter the cavity 1152 through the opening of the cavity 1152 and abuts against the limit switch 112.

There are two limit switches 112, where the two limit switches 112 are located at the two opposite ends of the lower cover 115 in the length direction respectively. In this way, the force exerted by the upper cover 114 on the lower cover 115 is more uniform, thereby avoiding deformation of the lower cover 115 due to long-term one-sided impact by the upper cover 114. Certainly, the manufacturer can also adjust the number of limit switches 112 and L-shaped plates 1142 as needed, which is not limited in the present disclosure.

Figure 6:
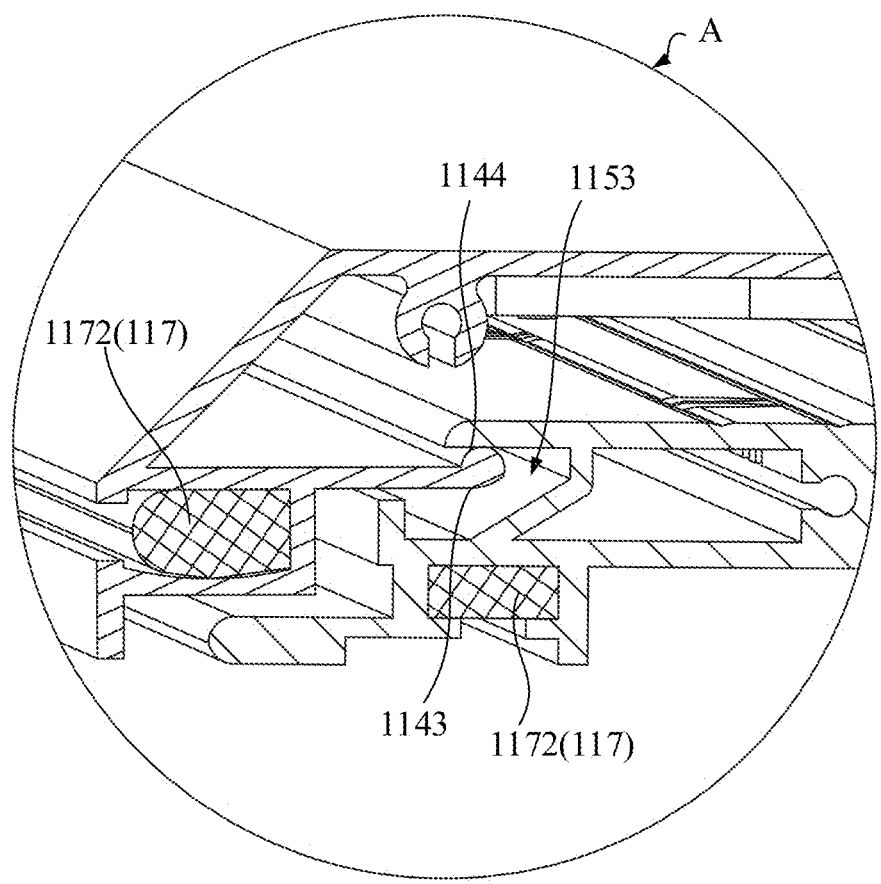
FIG. 6 is a partial enlarged view of an area A of the roller shutter tail cover shown in FIG. 5.

Specifically, reference is made to FIG. 5 and FIG. 6 in combination, in which FIG. 6 shows that the upper cover 114 is provided with a bump 1143 extending along a horizontal direction, a limit cavity 1153 is formed on one side of the lower cover 115 close to the bump 1143, at least part of the bump 1143 is embedded into the limit cavity 1153, and an upper surface of the bump 1143 abuts against a top wall of the limit cavity 1153 to limit motion of the upper cover 114 in a height direction. After the upper cover 114 collides with the lower cover 115, the front end part 1141 tends to tilt upwards due to inertia. When the upper cover 114 tilts upwards to a certain angle, the upper cover 114 may be stuck and cannot slide relative to the lower cover 115. The bump 1143 and the limit cavity 1153 can be disposed to prevent the upper cover 114 from tilting upwards, thereby preventing the upper cover 114 from getting stuck.

Further, the upper surface of the bump 1143 is provided with an arc-shaped portion abutting against the top wall of the limit cavity 1153. In this way, the frictional resistance caused to the motion of the upper cover 114 due to the fact that the upper surface of the bump 1143 abuts against the top wall of the limit cavity 1153 can be reduced. In some possible embodiments, the arc-shaped portion is formed from a deformable elastic material to further reduce the frictional resistance caused to the motion of the upper cover 114.

Specifically, continuously referring to FIG. 4, the limit switch 112 is a micro point touch switch with a micro point touch panel 1121. The micro point touch panel 1121 can be disposed to improve the sensitivity of the limit switch 112. Certainly, the manufacturer can also set the limit switch 112 as other existing switches on the market as needed.

Specifically, the limit device 113 is a lock body 1131 disposed in the cover body 111, the lock body 1131 has a deadbolt 1132 movably passing through the cover body 111, and the deadbolt 1132 can extend out of the cover body 111 and abuts against the slide rail 200 to limit motion of the cover body 111. In this embodiment, the lock body 1131 is correspondingly provided with two deadbolts 1132, where the two deadbolts 1132 are disposed at two opposite ends of the cover body 111 in a length direction, and the two deadbolts 1132 can simultaneously extend out of the cover body 111 to limit motion of the cover body 111. The deadbolts 1132 are disposed at the two ends of the cover body 111, such that the two ends of the cover body 111 can be limited, thereby avoiding deformation and shaking of the other end due to only limiting of one end.

Figure 7:
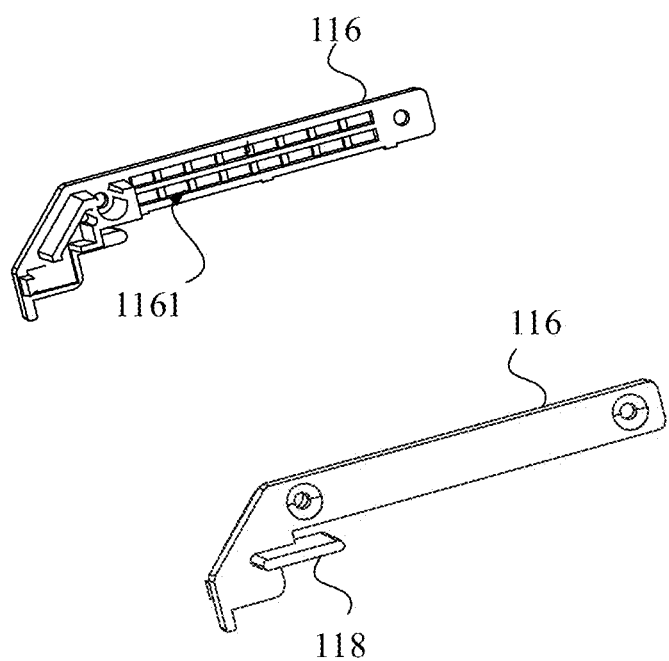
FIG. 7 is an enlarged view of a side bracket shown in FIG. 4.

Specifically, referring to FIG. 4 and FIG. 7 in combination, the roller shutter tail cover 110 further includes an elastic damper 118 for reducing impact. There are two elastic dampers 118, where the two elastic dampers 118 are located on two opposite sides of the cover body 111 in the length direction respectively. The elastic damper 118 can reduce vibration and impact caused by touch of the roller shutter tail cover 110 through its own deformation to play a buffering role. It can be understood that the manufacturer can freely adjust the type and number of elastic dampers 118 as needed.

Referring to FIG. 4 and FIG. 6 in combination, in this embodiment, the roller shutter tail cover 110 further includes a light strip 117, where the light strip 117 is disposed on the cover body 111. In this way, different lighting effects can be achieved by controlling the turn-on or turn-off, flashing, light color, or the like of the light strip 117.

Specifically, the light strip 117 includes a brake light 1171, where the brake light 1171 is disposed on an outer surface of the cover body 111, and the brake light 1171 is configured to be capable of being turned on or off based on a motion state of the vehicle. For example, when the vehicle brakes, the brake light 1171 is turned on and flashes continuously to alert other vehicles.

The light strip 117 further includes a lighting strip 1172, where the lighting strip 1172 is located on an outer surface of the cover body 111. The lighting strip 1172 is disposed on an outer surface of the upper cover 114 and/or the outer surface of the lower cover 115. Specifically, in this embodiment, a lower surface of the lower cover 115 and a side surface of the upper cover 114 are both provided with lighting strips 1172, the lower surface of the lower cover 115 and the side surface of the upper cover 114 are both formed with clamping grooves, the lighting strips 1172 are embedded into the clamping grooves and fixed in the clamping grooves, a length extension direction of the lighting strip 1172 is parallel to a length extension direction of the cover body 111, and at least part of a lighting path of the lighting strip 1172 enters the truck bed.

Specifically, the roller shutter tail cover 110 further includes a circuit board disposed in the cover body 111 and electrically connected to the light strip 117. The circuit board is configured to control turn-on and turn-off of the light strip 117. In addition, the circuit board can also control the flashing, light color, and other lighting effects of the light strip 117. It can be understood that in some other embodiments, the circuit board may also be disposed on other parts of the roller shutter cover 10, for example, the circuit board may be disposed on the slide rail 200.

Specifically, the roller shutter tail cover 110 further includes a power supply for supplying power to the light strip 117, where the power supply may be a dry battery, a rechargeable mobile power supply, etc. Alternatively, the roller shutter tail cover 110 may be provided with a power interface or a power cord for an external power supply. In addition, the roller shutter tail cover 110 may also be provided with the power supply and the interface or the cord for the external power supply.

Accordingly, the manufacturer can freely arrange the circuit board and the power supply as needed to achieve the purposes of supplying power to the light strip 117 and controlling the light strip 117, which is not limited in the present disclosure.

Specifically, in an embodiment, a light strip 117 is disposed on the slide rail 200. The light strip 117 disposed on the slide rail 200 is similar to the light strip 117 disposed on the roller shutter tail cover 110, which will not be repeated herein. Certainly, the light strip 117 on the slide rail 200 may also be omitted.

Continuously referring to FIG. 1, the roller shutter cover 10 further includes a driving motor 300 for driving the roller shutter 100, where the driving motor 300 is connected to one end of the roller shutter 100, and the driving motor 300 can drive the roller shutter 100 to move on the slide rail 200 so that the roller shutter 100 switches between the opened state and the storage state. Certainly, the roller shutter cover 10 may also switch between the opened state and the storage state by manually operating the roller shutter 100 without arrangement of the driving motor 300. Alternatively, the roller shutter cover 10 is provided with the driving motor 300, and thus has an electric mode and a manual mode.

In another embodiment, the limit device 113 is a motor controller capable of controlling operation of the driving motor 300, and the limit switch 112 is connected to the motor controller by means of wired or wireless signal connection. Exemplarily, the specific control process is as follows: when the cover body 111 is touched to trigger the limit switch 112, the limit switch 112 sends an electrical signal to the motor controller, and the motor controller receives the electrical signal to turn off the driving motor 300.

What is claimed is:

1. A roller shutter tail cover, applied to a roller shutter cover of a vehicle, and comprising:
   a cover body;
   a limit switch disposed on the cover body; and
   a limit device connected to the limit switch,
   wherein during motion of the roller shutter tail cover, when the limit switch is touched, the limit switch starts the limit device, and the limit device works to limit the motion of the roller shutter tail cover.

2. The roller shutter tail cover according to claim 1, wherein the cover body comprises an upper cover and a lower cover sequentially arranged in a height direction, the upper cover is movably connected to the lower cover and is slidable relative to the lower cover, the upper cover has a front end part protruding from an outer surface of the lower cover, and the limit switch is disposed on the lower cover and located inside the cover body; and
   during motion of the roller shutter tail cover, the front end part is capable of being touched to slide the upper cover relative to the lower cover, such that the upper cover abuts against the limit switch.

3. The roller shutter tail cover according to claim 2, further comprising a side bracket sleeved at one end of the lower cover in a length direction, wherein a sliding groove is formed on one side of the side bracket close to the upper cover; and
   one end of the roller shutter tail cover in a length direction is inserted into the sliding groove, such that the upper cover is slidable relative to the lower cover.

4. The roller shutter tail cover according to claim 3, wherein there are two side brackets located at two opposite ends of the lower cover in the length direction respectively, and two opposite ends of the upper cover in a length direction are inserted into corresponding sliding grooves respectively.

5. The roller shutter tail cover according to claim 3, wherein the upper cover is provided with an L-shaped plate protruding from a lower surface thereof, the lower cover is provided with an abutting portion protruding from an upper surface thereof, the abutting portion is formed with a cavity of which an opening faces the L-shaped plate, and the limit switch is located on a sidewall of the cavity; and under an external force, a front end of the L-shaped plate is capable of entering the cavity through the opening of the cavity and abuts against the limit switch.

6. The roller shutter tail cover according to claim 5, wherein there are two limit switches located at the two opposite ends of the lower cover in the length direction respectively.

7. The roller shutter tail cover according to claim 3, wherein the upper cover is provided with a bump extending along a horizontal direction, a limit cavity is formed on one side of the lower cover close to the bump, at least part of the bump is embedded into the limit cavity, and an upper surface of the bump abuts against a top wall of the limit cavity to limit motion of the upper cover in a height direction.

8. The roller shutter tail cover according to claim 7, wherein the upper surface of the bump is provided with an arc-shaped portion abutting against the top wall of the limit cavity.

9. The roller shutter tail cover according to claim 1, wherein the limit switch is a micro point touch switch with a micro point touch panel.

10. The roller shutter tail cover according to claim 1, wherein the limit device is a lock body disposed in the cover body and having a deadbolt movably passing through the cover body, and the deadbolt is capable of extending out of the cover body to limit motion of the cover body.

11. The roller shutter tail cover according to claim 10, wherein the lock body is provided with two deadbolts disposed at two opposite ends of the cover body in a length direction and capable of simultaneously extending out of the cover body to limit motion of the cover body.

12. The roller shutter tail cover according to claim 1, further comprising an elastic damper for reducing impact.

13. The roller shutter tail cover according to claim 12, wherein there are two elastic dampers located at two opposite ends of the cover body in a length direction respectively.

14. The roller shutter tail cover according to claim 1, further comprising a light strip disposed on the cover body.

15. The roller shutter tail cover according to claim 14, wherein the light strip comprises a brake light disposed on an outer surface of the cover body and configured to be capable of being turned on or off based on a motion state of the vehicle.

16. The roller shutter tail cover according to claim 14, wherein the light strip comprises a lighting strip located on an outer surface of the cover body.

17. The roller shutter tail cover according to claim 14, further comprising a circuit board for controlling turn-on and turn-off of the light strip.

18. The roller shutter tail cover according to claim 14, further comprising a power supply for supplying power to the light strip, and/or a power interface for an external power supply.

19. A roller shutter cover, comprising:
a roller shutter comprising a plurality of sequentially connected shutter slats and the roller shutter tail cover according to claim 1; and
a slide rail, wherein the roller shutter is connected to the slide rail and is movable on the slide rail, and the limit device is capable of limiting motion of the roller shutter tail cover on the slide rail.

20. The roller shutter cover according to claim 19, wherein a light strip is disposed on the slide rail; and/or
the roller shutter cover further comprises a driving motor for driving the roller shutter, the limit device is a motor controller capable of controlling operation of the driving motor, and the limit switch is connected to the motor controller by means of wired or wireless signal connection.

* * * * *